(12) United States Patent
Stubbe

(10) Patent No.: US 6,991,059 B2
(45) Date of Patent: Jan. 31, 2006

(54) STEERING DRIVE FOR INDUSTRIAL TRUCKS

(75) Inventor: Matthias Stubbe, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 10/776,964

(22) Filed: Feb. 10, 2004

(65) Prior Publication Data

US 2004/0168850 A1 Sep. 2, 2004

(30) Foreign Application Priority Data

Feb. 28, 2003 (DE) .............................. 103 08 726

(51) Int. Cl.
*B62D 7/08* (2006.01)
(52) U.S. Cl. ..................... 180/253; 180/6.28; 74/409
(58) Field of Classification Search ............... 180/6.28, 180/234, 253, 252, 444; 74/443 X, 445 X
See application file for complete search history.

(56) References Cited

U.S. PATENT DOCUMENTS

| 1,191,907 | A |   | 7/1916  | Northrup ..................... 74/443 |
| 1,803,296 | A | * | 4/1931  | Bethune ...................... 74/443 |
| 3,531,976 | A | * | 10/1970 | Fuhrman ..................... 72/478 |
| 3,808,906 | A | * | 5/1974  | Bowers ....................... 74/443 |
| 5,400,672 | A | * | 3/1995  | Bunch, Jr. ................... 74/409 |
| 5,924,512 | A | * | 7/1999  | Wada .......................... 180/253 |
| 6,491,127 | B1 | * | 12/2002 | Holmberg et al. .......... 180/252 |
| 2005/0139029 | A1 | * | 6/2005 | Fukizawa ..................... 74/445 |

FOREIGN PATENT DOCUMENTS

| DE | 834 799       | 3/1952 |
| DE | 44 26 325 A1  | 3/1995 |
| DE | 199 40 924 A1 | 4/2000 |
| JP | 57107464 A    | 7/1982 |

\* cited by examiner

*Primary Examiner*—Tony Winner
(74) *Attorney, Agent, or Firm*—Vidas, Arrett & Steinkraus, P.A.

(57) ABSTRACT

A steering drive for an industrial truck, comprising a steered wheel which is rotatably supported about a horizontal axis in a bearing component wherein the bearing component is pivotally supported about a vertical axis and has a ring gear, and a steering motor which drives a pinion meshing with the ring gear, wherein the ring gear or pinion has a circumferential groove in which a ring-shaped absorbing member of a resilient material is received so that the teeth of the pinion or ring gear get into engagement with the absorbing member.

3 Claims, 1 Drawing Sheet

STEERING DRIVE FOR INDUSTRIAL TRUCKS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

It is known for industrial trucks to use an electric or hydraulic steering drive in combination with a so-called electric steering mechanism. The steering angle predetermined by the steering wheel or similar operating member is transmitted electrically to a steering drive which is disposed in the direct vicinity of the driven or steered wheel. The steered wheel is rotatably supported about a horizontal axis in a bearing component and the bearing component, in turn, is pivotally supported about a vertical axis. If the steered wheel is also a driven wheel the bearing component is defined by the casing of a transmission which is in an operatively connection to a driving engine. Both the driving engine and transmission are frequently arranged in a body bolster which is pivotable about a vertical axis.

It is well imaginable to transmit the steering torque to the bearing component by means of a linear motor. However, a rotary piston engine is provided in most cases which acts upon the bearing component via a gear transmission. The transmission of the torque to a ring gear of the bearing component, for example, from the pinion of the rotary piston engine is performed either by means of a chain or even directly. Undesirable noise will be emitted specifically in case of a direct transmission to the ring gear from the pinion of the driving motor because two mechanically rigid systems engage each other.

It is the object of the invention to provide a steering drive for an industrial truck which reduces the development of noise although there is a direct engagement of a pinion with a ring gear.

BRIEF SUMMARY OF THE INVENTION

In the invention, the ring gear or pinion has a circumferential groove in which a ring-shaped absorbing member of a resiliently yielding material is received such that the teeth of the pinion or ring gear get into engagement with the absorbing member.

The cross-section of the absorbing member preferably is circular so that the absorbing member can be defined by an O-ring. However, other profiles can also be contemplated. The material of the absorbing ring requires to be yielding and have sufficiently elastic properties in any case. Besides, the material should undergo low wear in order to be efficient over a long service life. However, no adverse consequences will result for the operation of the steering drive when the absorbing member undergoes more wear or fails. Any failure of the steering mechanism need not be feared therefrom.

In an aspect of the invention, the ring gear or pinion is defined by two adjacent tooth lock washers which form the groove in their contacting areas. The groove can be formed here by two half-grooves of the tooth lock washers or merely in one of the two tooth lock washers. The cross-sectional profile of the groove is preferably conformed to that of the absorbing ring which is received. When two tooth lock washers are used it is easy to exchange the absorbing ring.

BRIEF DESCRIPTION OF THE SEVERAL VIEWS OF THE DRAWINGS

The invention will be described in more detail below with reference to an embodiment shown in the drawings.

DETAILED DESCRIPTION OF THE INVENTION

Figure 1:
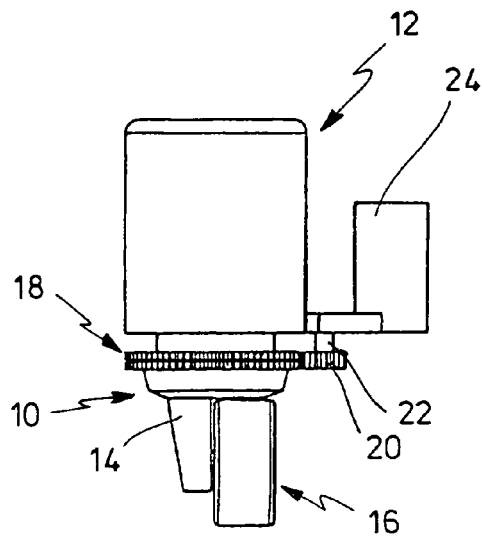
FIG. 1 shows a side view of a body bolster with a driving motor and a steering motor for an industrial truck.

While this invention may be embodied in many different forms, there are described in detail herein a specific preferred embodiment of the invention. This description is an exemplification of the principles of the invention and is not intended to limit the invention to the particular embodiment illustrated In FIG. 1, a body bolster is shown at 10 which has disposed thereon a driving motor 12 of an industrial truck, which is not shown in detail. The body bolster 10 is rotatably supported about a vertical axis in the frame of the driving portion of the industrial truck. Disposed in the body bolster is also a transmission 14 for a driving wheel 16 which is rotatably supported about a horizontal axis in the casing of the transmission 14.

The body bolster 10 has a ring gear 18 which meshes with a pinion 20. The pinion 20 is coupled to a steering motor 24 via a steering transmission 22. The steering motor 24 can be mounted on the driving motor 12 and can be a hydraulic or electric rotary motor. The rotary motor 24 receives a setting signal from a steering control which, in turn, receives its set point from the steering member, namely in an electric way.

Figure 2:
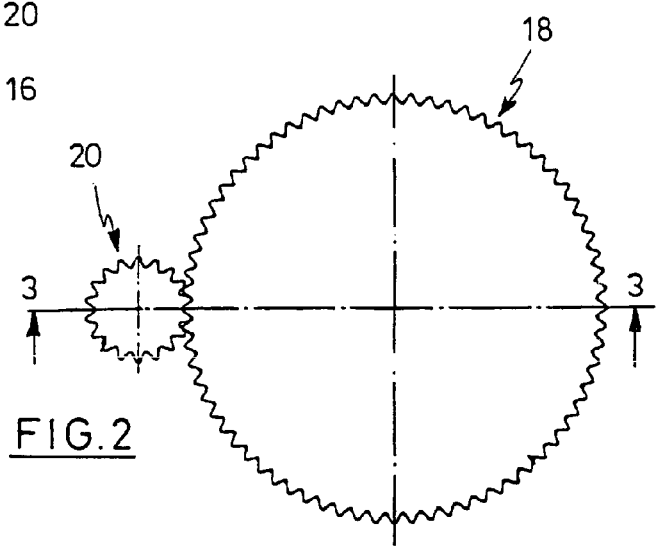
FIG. 2 shows a plan view of a ring gear of the body bolster of FIG. 1 that meshes with a pinion of a steering motor.
Figure 3:
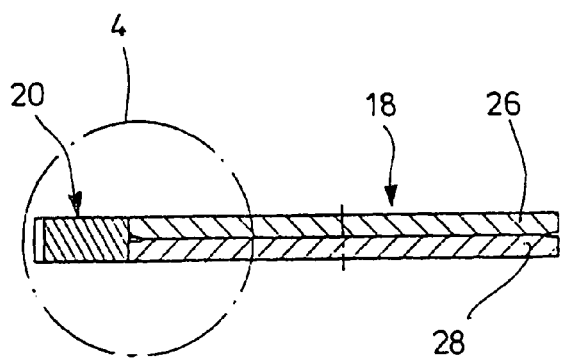
FIG. 3 shows a section through the assembly of FIG. 2 along line 3—3.
Figure 4:
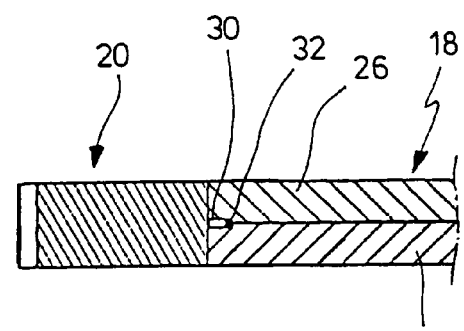
FIG. 4 shows the detail 4 of FIG. 3 at an enlarged scale.

FIG. 2 illustrates the ring gear 18 and pinion 20 in a front view. In FIG. 3, it can be seen that the ring gear 18 is comprised of two washers 26, 28 which are placed flat against each other. The connection of the two washers 26, 28, which is rotationally stable, is not shown. From FIG. 4, it can specifically be seen that the washers 26, 28 define a circumferential groove 30 in their contacting areas in which an O-ring 32 of a resilient material is placed. The depth of the groove 30 and the radial extension of the ring 32 is such that the teeth of the pinion 20, while engaging the gaps between the teeth of the ring gear 18, get into engagement with the ring 32 and deform it slightly. This manner attenuates the noise which is emitted.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the feature of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A steering drive for an industrial truck, comprising a steered wheel which is rotatably supported about a horizontal axis in a bearing component wherein the bearing component is pivotally supported about a vertical axis and has a ring gear, and a steering motor which drives a pinion meshing with the ring gear, the ring gear being composed of two adjacent gear discs which define a circumferential groove in a gear disc contacting area, a ring-shaped noise absorbing member of a resilient material being accommodated by the groove so that the teeth of the pinion engage the noise absorbing member.

2. The steering drive as claimed in claim 1, characterized in that the ring gear is defined by two adjacent tooth lock washers which define a groove in a lock washers contacting area.

3. The steering drive as claimed in claim 1, characterized in that the ring-shaped noise absorbing member is defined by an O-ring.

* * * * *